(12) United States Patent
Cheng

(10) Patent No.: US 9,807,366 B2
(45) Date of Patent: Oct. 31, 2017

(54) TWO-CHANNEL REFLECTOR BASED SINGLE-LENS 2D/3D CAMERA WITH DISPARITY AND CONVERGENCE ANGLE CONTROL

(71) Applicant: AMCHAEL VISUAL TECHNOLOGY CORPORATION, Hsinchu (TW)

(72) Inventor: Kai Michael Cheng, Lexington, KY (US)

(73) Assignee: AMCHAEL VISUAL TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/413,832

(22) Filed: Jan. 24, 2017

(65) Prior Publication Data

US 2017/0134711 A1    May 11, 2017

Related U.S. Application Data

(63) Continuation of application No. 13/921,739, filed on Jun. 19, 2013, now Pat. No. 9,557,634.

(60) Provisional application No. 61/668,421, filed on Jul. 5, 2012.

(51) Int. Cl.
| | | |
|---|---|---|
| *H04N 15/00* | (2006.01) |
| *H04N 13/02* | (2006.01) |
| *G02B 27/22* | (2006.01) |
| *H04N 5/225* | (2006.01) |
| *G03B 35/10* | (2006.01) |
| *G03B 17/56* | (2006.01) |
| *H04N 13/00* | (2006.01) |

(52) U.S. Cl.
CPC ......... *H04N 13/0217* (2013.01); *G02B 27/22* (2013.01); *G03B 17/565* (2013.01); *G03B 35/10* (2013.01); *H04N 5/2254* (2013.01); *H04N 2013/0081* (2013.01)

(58) Field of Classification Search
CPC ................................................. H04N 13/0217
USPC .......................................................... 348/49
See application file for complete search history.

(56) References Cited

U.S. PATENT DOCUMENTS

| | | | | |
|---|---|---|---|---|
| 5,017,952 A | * | 5/1991 | Wheeler | G03B 35/10 |
| | | | | 359/466 |
| 6,643,396 B1 | * | 11/2003 | Hendriks | G01C 11/06 |
| | | | | 250/559.23 |
| 2003/0072570 A1 | * | 4/2003 | Seo | G03B 35/00 |
| | | | | 396/331 |
| 2003/0133707 A1 | * | 7/2003 | Perisic | H04N 13/0217 |
| | | | | 396/324 |

FOREIGN PATENT DOCUMENTS

JP    2006337742 A  *  12/2006

* cited by examiner

*Primary Examiner* — Gims Philippe
*Assistant Examiner* — Amir Shahnami
(74) *Attorney, Agent, or Firm* — King & Schickli, PLLC

(57) ABSTRACT

A single-lens two-channel reflector provides the capability to switch between two-dimensional and three-dimensional imaging. The reflector includes laterally displaceable outward reflectors and displaceable inward reflectors that can simultaneously provide left and right images of a scene to an imager, and controllers for controlling relative distance between the outward and the inward reflectors, and for controlling deflection angle of the inward reflectors, so as to enable the adjustment of disparity and convergence angle.

20 Claims, 14 Drawing Sheets

TWO-CHANNEL REFLECTOR BASED SINGLE-LENS 2D/3D CAMERA WITH DISPARITY AND CONVERGENCE ANGLE CONTROL

This utility patent application claims the benefit of priority as a continuation of U.S. patent application Ser. No. 13/921,739 filed on Jun. 19, 2013 and also claims priority in U.S. Provisional Patent Application Ser. No. 61/668,421 filed on Jul. 5, 2012, the entirety of the disclosure of each of which is incorporated herein by reference.

TECHNICAL FIELD

The present disclosure relates to two-dimensional (2D) and three-dimensional (3D) imaging. More specifically, this disclosure pertains to imaging systems allowing switching between 2D and 3D image modes. In 3D mode, the attachments allow acquisition of simultaneous left and right views of a scene using a single imager, also providing the capability of disparity and convergence angle control.

BACKGROUND OF THE INVENTION

Classic computer stereovision systems use two imagers such as cameras to shoot pictures of the same scene from different angles. The cameras are separated by an interocular distance, and are synchronized. A computer then calculates depths of objects in the scene by comparing images shot by the two different cameras. This is done by shifting one image on top of the other one to find the parts that match. The distance or amount the images must be shifted to find a best match is called the disparity. The disparity at which objects in the images best match is used by a computer to calculate their depths and provide a three-dimensional image of the scene.

A multi-view imaging system uses only one camera to calculate the object depth. In most cases, such a system uses specially designed mirrors or prisms to create virtual cameras. With the views captured by the real camera and the virtual cameras side-by-side or one above the other, the computer can use the same scheme as in classic computer vision to calculate the depth of an object.

In prior art multi-view imaging systems, two pairs of flat reflectors such as mirrors are used to define two light channels: a left channel and a right channel, encased in a dust and light proof housing device that fits in front of a camera lens in the same manner as a close-up accessory or telephoto adapter (see FIG. 1). Within each channel, one of the mirrors takes incoming light rays and reflects the light rays to the other mirror for it to output the light rays to an imager such as a camera, CCD, etc. through the lens. The mirror that takes the incoming light rays will be called an outward mirror (describing the orientation of the mirror relative to the incoming light rays and the imager) and the mirror that outputs light rays to the camera will be called an inward mirror. The inside vertical edges of the two inward mirrors are connected along the optical axis of the imager lens (see FIG. 1). Light rays into the left channel will generate a left view of the scene on the right half of the imager and light rays into the right channel will generate a right view of the scene on the left half of the imager. The device permits acquisition of simultaneous left and right views using a single imager. Such a device has been called a two-channel reflector (TCR).

To adjust the convergence angle of the optical axes of the virtual cameras, it is known to provide a TCR that allows a user to swivel the outward mirrors simultaneously and equally about their inside vertical edges with a ganging mechanism. A disadvantage of this approach is that making the convergence angle of the optical axes of the virtual cameras smaller (i.e., making the convergence point further away from the imaging system) also makes the interocular distance between the virtual cameras smaller and consequently lowers the disparity between the left view and the right view.

Improvements in the above design are also known, wherein the basic idea is to swivel the outward mirrors about their vertical centerlines, instead of the inside vertical edges. The advantage of this approach, in addition to adjusting the convergence angle of the views of the left virtual camera and the right virtual camera, is that it reduces the impact of the disparity reduction by one half.

Other prior art devices also allow the inward mirrors to be swiveled about their connected inside edges activated by rods connecting the inward mirrors and the outward mirrors. In these cases the outward mirrors could be swiveled about their inside edges instead of their centerlines. Location of the connected inside edges of the inward mirrors is fixed. However, the swiveling process of these prior art devices has not been mathematically modeled or characterized.

Another prior art two-channel reflector based multi-view imaging system includes a single hand held CCD mounted on a two-channel reflector. Like a typical TCR, light rays into the left channel generate a left view of the scene on the right half of the CCD and light rays into the right channel generate a right view of the scene on the left half of the CCD. Hence, an image generated by this imaging system contains two views of the scene, a left view and a right view. These views are used in camera calibration and correspondence estimation to obtain an accurate 3D model of the scene. A user can adjust the convergence angle of the virtual cameras by adjusting the outward mirrors about their centerlines. Like all the TCR models that have been developed so far, the disparity can be adjusted only as a side effect of adjustment of the convergence angle.

A stereographic imaging system with automatic control of interocular distance is known, but is a two-camera system. The system includes a left camera and a right camera with respective lenses. The system also includes mechanisms to synchronously set a focal length of the lenses, to synchronously set a focal distance of the lenses, to set a convergence angle between the left and the right cameras, and to set an interocular distance between the left and right cameras. A controller may determine a convergence based on the focal length. The controller may cause an interocular distance and a convergence angle between the left and right cameras to be set based on a maximum allowable disparity, the focal length of the lenses, the convergence distance, and a distance to an object in the scene. This is so far the only stereographic imaging system with the capability of direct control of both the convergence angle and the interocular distance (and so disparity) of the imaging process.

To the author's knowledge, no single lens multi-view imaging systems are available providing control of both convergence angle and interocular distance. In turn, to the author's knowledge no imaging systems providing the capability of switching between 2D and 3D modes are available.

SUMMARY OF THE INVENTION

To solve the foregoing problems and address the identified need in the art, in one aspect the present disclosure provides a single-lens two-channel reflector capable of enabling disparity and convergence angle control, of switching back and forth between a 2D and a 3D imaging mode, and further of meeting the demand of miniaturization. The reflector defines left and right imaging channels which are in turn each defined by a laterally displaceable outward reflector and a displaceable inward reflector. A first controller displaces the outward reflectors to change the relative distance between the outward and the inward mirror units thus controlling the intraocular distance of virtual cameras defined by the reflector and so the disparity. A second controller alters the deflection angle of the inward mirror units thus adjusting the convergence angle. Selective manipulation of these elements allows capturing images in either 2D or 3D mode. A third controller may be provided allowing displacement of each displaceable inward reflector.

In another aspect, the present disclosure further provides an imaging system comprising the single lens two-channel reflector, comprising an imager, a two-channel reflector as described above, and a housing defining an imaging inlet. The system can simultaneously capture the left view and right view of a scene to the imager to allow three-dimensional imaging, or may be adapted to capture only a single image of the scene to provide a two-dimensional image.

Still more, the present disclosure describes a method of obtaining two-dimensional and three-dimensional images of a scene from a single imager equipped with the single-lens two-channel reflector as described above.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

Figure 1:
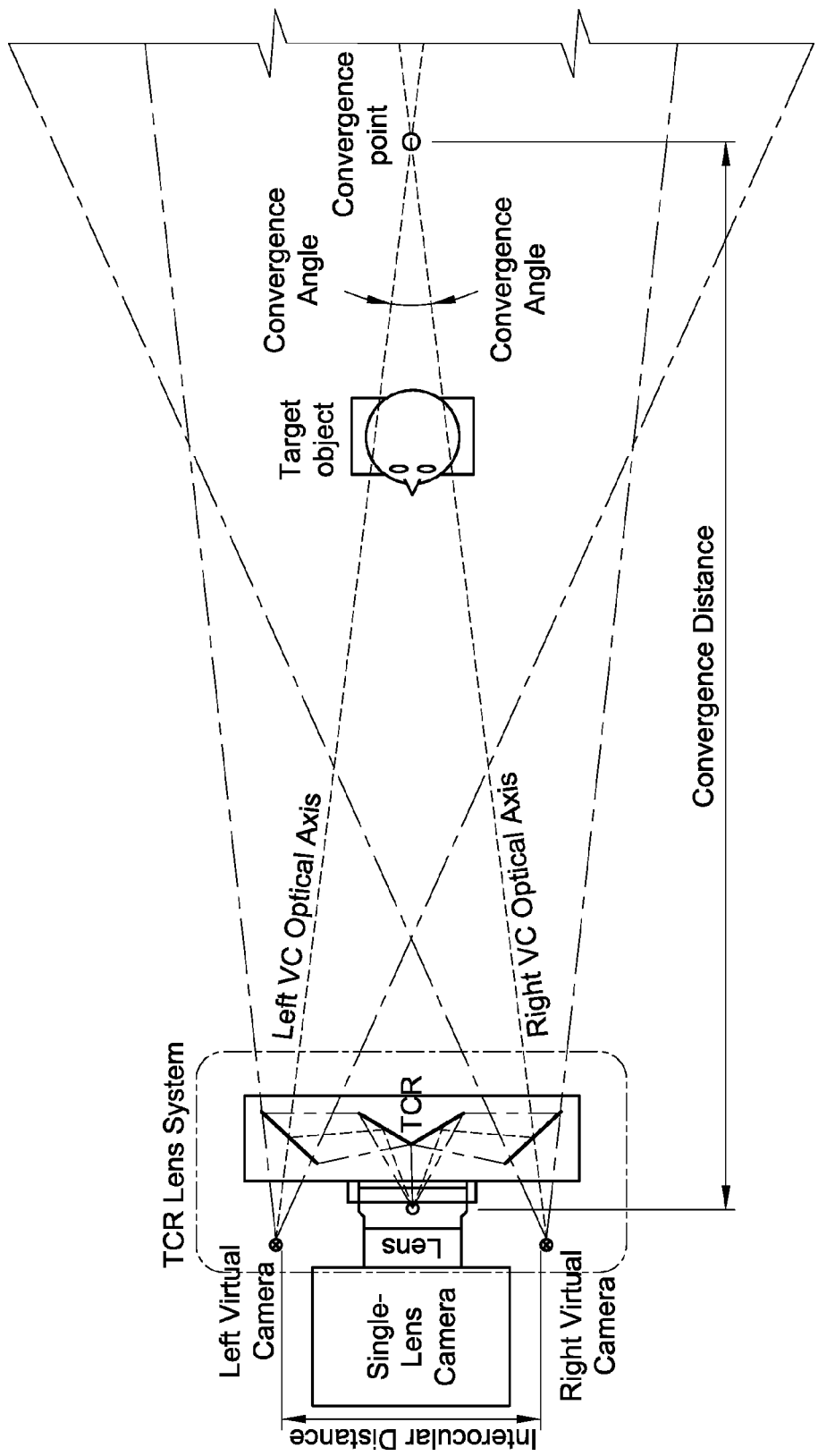
FIG. 1 depicts a prior art two-channel reflector based single lens multi-view imaging system.
Figure 2:
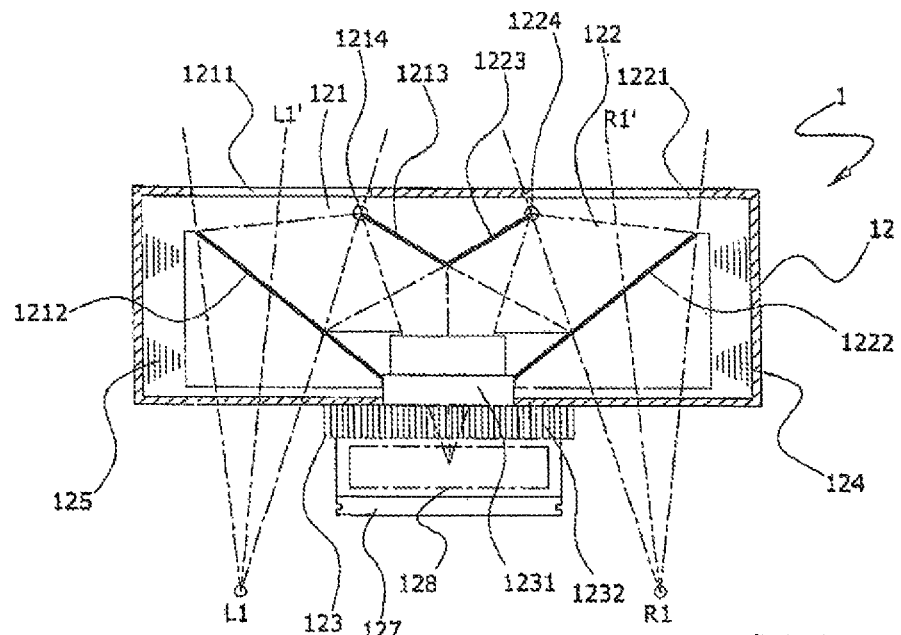
FIG. 2 depicts a two-channel reflector according to the present disclosure.

FIG. 2 is a schematic drawing of the two-channel reflector with lens (TCRL) 1 of the present disclosure. As shown in the figure, the present invention two-channel reflector based single lens 2D/3D camera with disparity and convergence angle control uses a two-channel reflector 12 to form the imaging channel. Referring to the figure, a left image inlet 1211, a left laterally displaceable outward reflector such as mirror unit 1212, and a left displaceable inward reflector such as mirror unit 1213 define a left imaging channel 121 in the two-channel reflector 12. It will be appreciated that any suitable light reflector can be utilized. A rotation shaft 1214 assembles with one end of the left inward mirror unit 1213, so the left inward mirror unit 1213 can deflect or pivot around the rotation shaft 1214 as a center. On the other side, a right image inlet 1221, a right displaceable outward mirror unit 1222, and a right displaceable inward mirror unit 1223 form the right imaging channel 122. One end of the right inward mirror unit 1223 is connected to a rotation shaft 1224, so the right inward mirror unit 1223 can deflect around the rotation shaft 1224 as a center. As described above, the left imaging channel 121 and the right imaging channel 122, formed by respective image inlet (1211, 1221), respective outward mirror unit (1212, 1222), and respective inward mirror unit (1213, 1223), define the reflection paths of the images (or light rays).

Referring to the figure, a first controller 123 actuates the outward mirror units (1212, 1222) to cause displacement, so as to change the relative distance between respective outward mirror unit (1212, 1222) and inward mirror unit (1213, 1223). The first controller 123 may comprise an idler unit 1231 such as a CAM unit connected to a rotation disc 1232. The end edges of the idler unit 1231 are operatively coupled to respective outward mirror units (1212, 1222), i.e., the idler unit 1231 can be actuated by operating the first controller 123, so that the outward mirror units (1212, 1222) can be pushed simultaneously to the left and to the right, respectively, by the idler unit 1231. Referring again to the figure, the left imaging channel 121 and the right imaging channel 122 allow the left image (or, left view) L1' and the right image (or, right view) R1' of the scene to enter the two-channel reflector 12 through these two channels (121, 122), then these left and right images (L1', R1') enter the camera through the lens 128 of the two-channel reflector after the reflection by respective outward mirror unit (1212, 1222) and respective inward mirror unit (1213, 1223). As shown in the figure, the configuration of the present reflector produces two virtual cameras (L1, R1), so as to achieve the effect of simultaneous multi-view capturing of a scene by a single camera.

Further as shown in the figure, each unit can be accommodated in a housing 124, and the rotation disc 1232 and the idler unit 1231 of the first controller 123 can be assembled or axis located in the housing 124 so as to be easily operated by operators. One or more biasing elements such as coiled springs 125 may be provided between the housing 124 and respective outward mirror unit (1212, 1222) so the outward mirror unit (1212, 1222) can be returned to its original position by action of the springs 125. Optionally, in order for the present invention to be more compact, portable and functionally complete, a lens set can be disposed in its mechanism so that the whole device can be directly attached to a camera through an adapter ring 127, instead of being attached to the lens of a camera.

Figure 3:
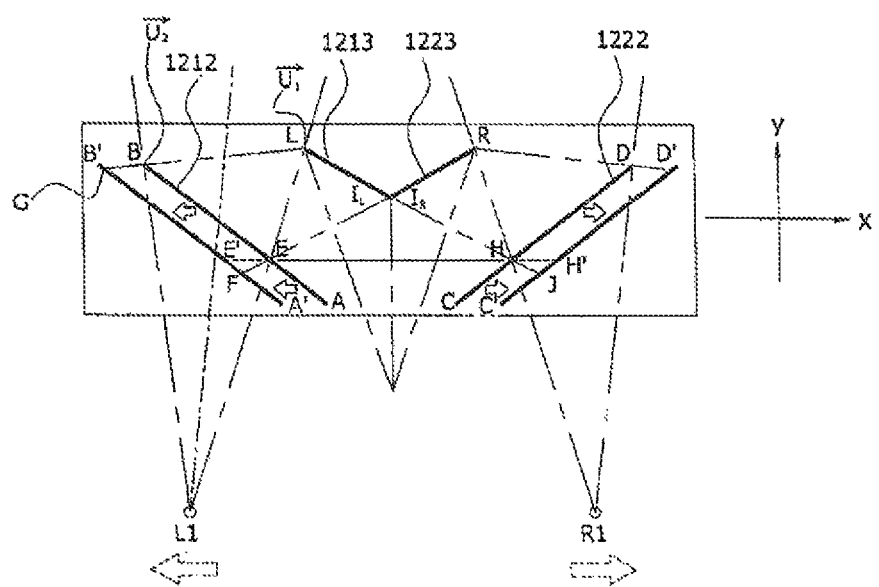
FIG. 3 is a schematic drawing of the two-channel reflector of FIG. 2 showing displacement of the outward mirror units.

As shown in FIG. 3, each outward mirror unit (1212, 1222) can be displaced from its original location (see arrows). After displacement, the relative distance between respective outward mirror unit (1212, 1222) and inward mirror unit (1213, 1223) will change. The relative distance between the two virtual cameras (L1, R1) will change accordingly. This provides adjustment of the intraocular distance.

Referring to the figure, the original location of the left virtual camera L1 (assume it is LVC) can be calculated as set forth below.

Assume and $\vec{U}_1$ and $\vec{U}_2$ are unit vectors in the directions of specular reflections of $\overrightarrow{I_L E}$ and $\overrightarrow{LB}$ with respect to $\overrightarrow{AB}$, respectively, where $\overrightarrow{AB}$ is the mirror surface of the left outward mirror unit (1212). The location LVC of the left virtual camera L1 can be calculated as $$LVC = E + t\vec{U}_1$$

where $t=(\Delta_2-\Delta_3)/\Delta_1$, with $\Delta_1$, $\Delta_2$ and $\Delta_3$ being determinants of the following matrices $$\begin{bmatrix} (\vec{U}_1)_x & (\vec{U}_1)_y \\ (\vec{U}_2)_x & (\vec{U}_2)_y \end{bmatrix}, \begin{bmatrix} B_x & B_y \\ (\vec{U}_2)_x & (\vec{U}_2)_y \end{bmatrix}, \begin{bmatrix} E_x & E_y \\ (\vec{U}_2)_x & (\vec{U}_2)_y \end{bmatrix},$$

respectively. Location of the right virtual camera is symmetric to the left virtual camera about the optical axis of the camera (the y-axis).

When the left outward mirror unit 1212 moves to the left (in −x direction), the intersection of light ray $\overrightarrow{I_L E}$ with the left outward mirror unit 1212 changes from E to F, and the intersection of light ray $\overrightarrow{LB}$ with the left outward mirror unit 1212 changes from B to G. New location of the left virtual camera L1 can be calculated by the following formula:

$$LVC' = F + t_1 \vec{U}_1$$

where $t_1=(\overline{\Delta}_2-\overline{\Delta}_3)/\overline{\Delta}_1$, with $\overline{\Delta}_2$ and $\overline{\Delta}_3$ being determinants of the following matrices:

$$\begin{bmatrix} G_x & G_y \\ (\vec{U}_2)_x & (\vec{U}_2)_y \end{bmatrix} \text{ and } \begin{bmatrix} F_x & F_y \\ (\vec{U}_2)_x & (\vec{U}_2)_y \end{bmatrix},$$

respectively, and $\Delta_1$ being defined as above.

Changing the intraocular distance of the virtual cameras can change their convergence point. Let $\vec{U}_1$ and $\vec{U}_2$ be unit vectors in optical axes of the left and right virtual cameras, respectively, and they can be obtained as below:

$$\vec{U}_l = (\vec{U}_1 + \vec{U}_2)/\|\vec{U}_1 + \vec{U}_2\|$$

$$\vec{U}_r = (-(\vec{U}_1)_x, (\vec{U}_1)_y)$$

$$RVC = (-(LVC)_x, (LVC)_y)$$

The original convergence points CP of the right virtual camera RVC and the left virtual camera LVC can be calculated by the following formula:

$$CP = LVC + t_2 \vec{U}_l$$

where $t_2=(\Delta_5-\Delta_6)/\Delta_4$, $\Delta_4$, $\Delta_5$ and $\Delta_6$ being determinants of the following matrices:

$$\begin{bmatrix} (\vec{U}_l)_x & (\vec{U}_l)_y \\ (\vec{U}_r)_x & (\vec{U}_r)_y \end{bmatrix}, \begin{bmatrix} (RVC)_x & (RVC)_y \\ (\vec{U}_r)_x & (\vec{U}_r)_y \end{bmatrix}, \begin{bmatrix} (LVC)_x & (LVC)_y \\ (\vec{U}_r)_x & (\vec{U}_r)_y \end{bmatrix}$$

respectively. The new locations LVC' and RVC' of the virtual cameras can be obtained after changing the intraocular distance of the left and right virtual cameras. The formula for computing LVC' is described as above. RVC' and LVC' are symmetric to the optical axis (y axis) of the camera. The new location of convergence point CP' is calculated by:

$$CP' = LVC' + t_3 \vec{U}_l$$

where $t_3=(\overline{\Delta}_5-\overline{\Delta}_6)/\Delta_4$, and $\overline{\Delta}_5$ and $\overline{\Delta}_6$ being determinants of the following matrices:

$$\begin{bmatrix} (RVC')_x & (RVC')_y \\ (\vec{U}_r)_x & (\vec{U}_r)_y \end{bmatrix} \text{ and } \begin{bmatrix} (LVC')_x & (LVC')_y \\ (\vec{U}_r)_x & (\vec{U}_r)_y \end{bmatrix},$$

while $\Delta_6$ is defined as above.

Figure 4:
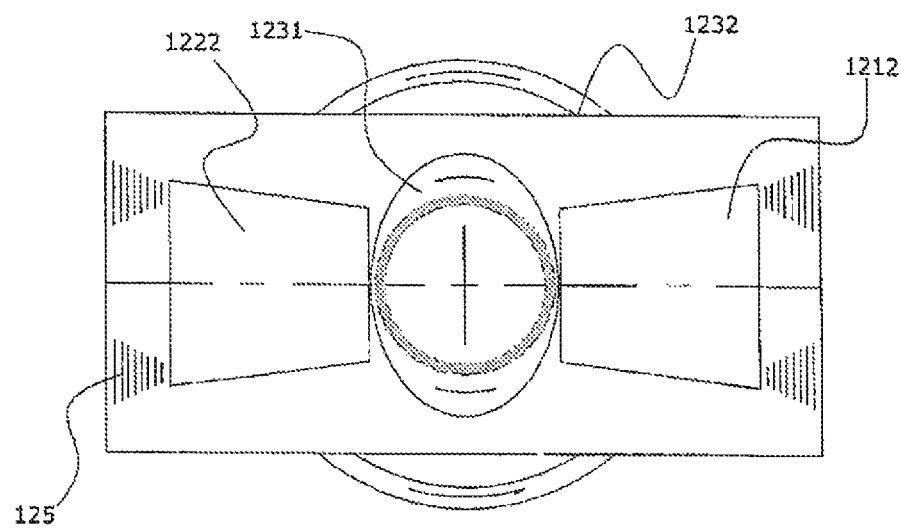
FIG. 4 depicts an idler unit for displacing the outward mirror units of FIG. 3.
Figure 5:
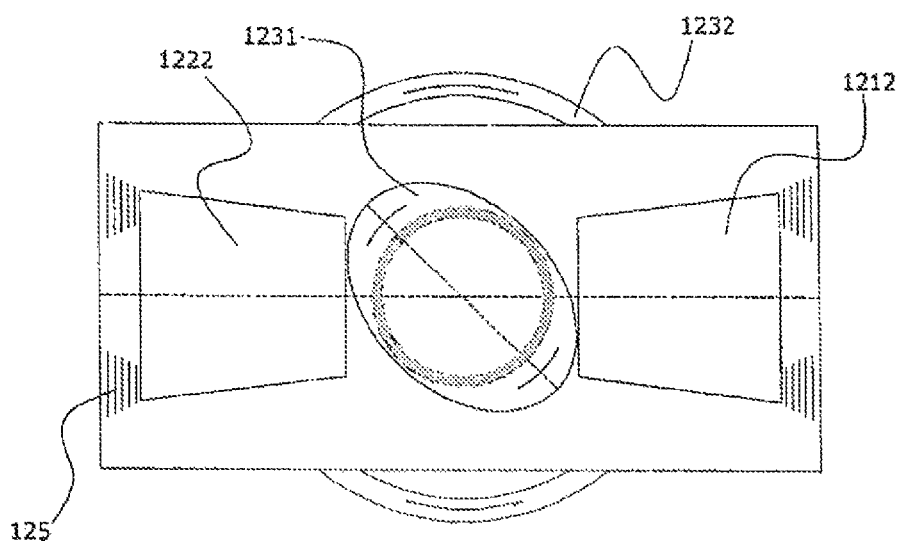
FIG. 5 depicts actuation of the idler unit of FIG. 4.
Figure 6:
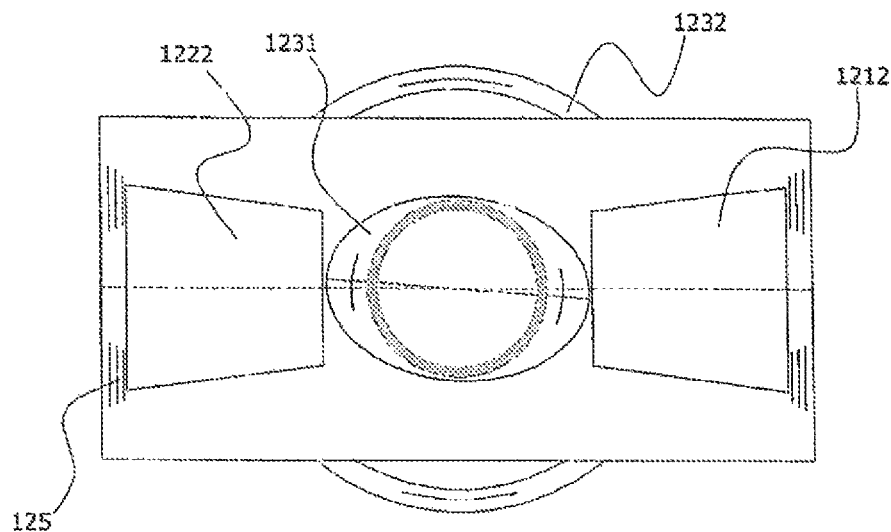
FIG. 6 depicts the idler unit of FIG. 3 having displaced the outward mirror units to maximum displacement.

FIGS. 4 to 6 depict an embodiment of a first controller 123 for displacing the displaceable outward mirrors. FIG. 4 is a schematic showing each outward mirror unit (1212, 1222) located at its original position. In FIG. 5, when adjusting disparity during imaging, a user actuates a rotation disc 1232 of the first controller 123 to cause the idler unit 1231 to move. As shown in the figures, the idler unit 1231 rotation simultaneously displaces each outward mirror unit (1212, 1222) in opposite directions. FIG. 6 is a schematic showing each outward mirror unit (1212, 1222) at maximum displacement. Thus, adjusting the first controller 123 adjusts the intraocular distance and so the disparity when imaging.

Figure 7:
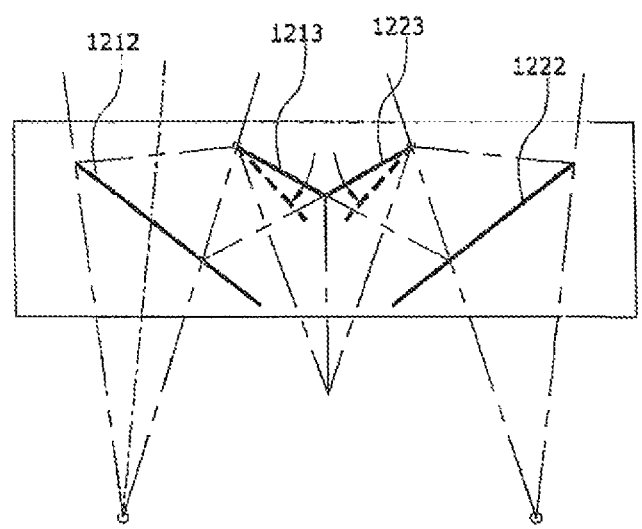
FIG. 7 is a schematic drawing of the two-channel reflector of FIG. 2 showing pivoting of the inward mirror units.
Figure 8:
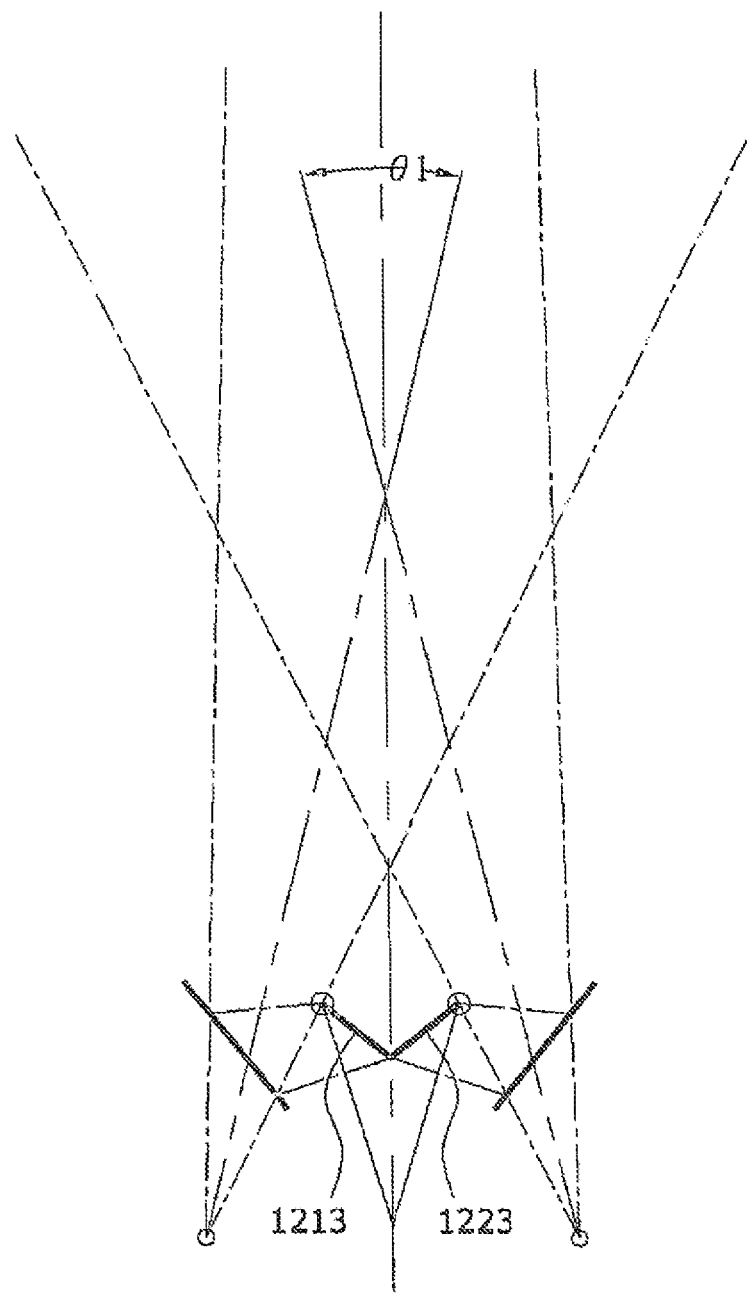
FIG. 8 shows the inward mirror units disposed to define a convergence angle θ1.
Figure 9:
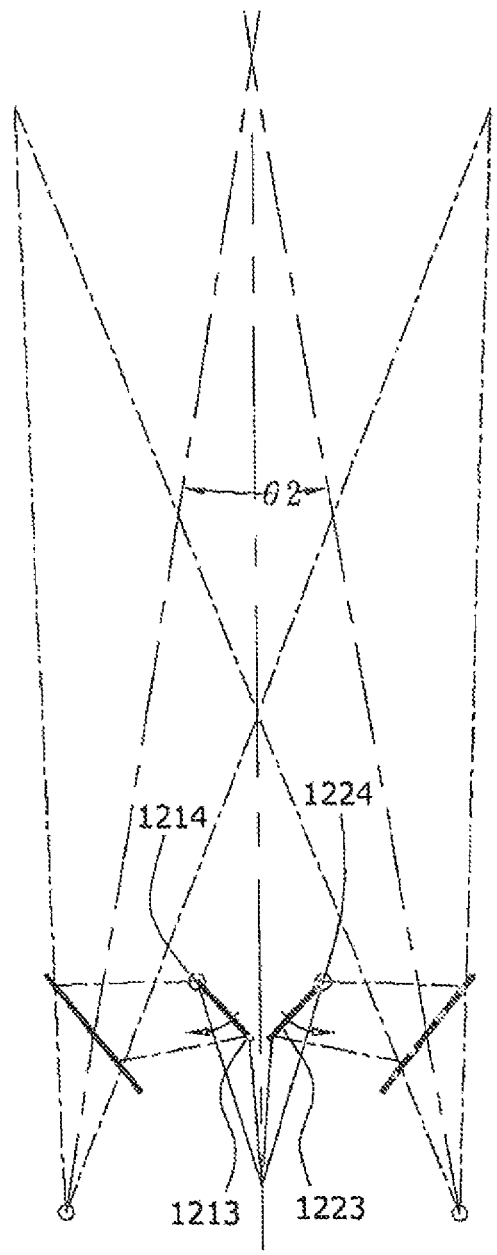
FIG. 9 shows the inward mirror units pivoted to define a decreased convergence angle θ2.

FIG. 7 shows adjustment of a convergence angle in the imaging process. When the convergence angle is changed by pivoting displaceable inward mirror units 1213, 1223, a suitable deflection angle is generated in respective inward mirror units (1213, 1223) so as to change a refraction angle between respective inward mirror units (1213, 1223) and the corresponding outward mirror units (1212, 1222), thus changing the convergence angle. FIG. 8 shows respective inward mirror units (1213, 1223) prior to deflection, assuming the original convergence angle is θ1. FIG. 9 shows use of the inward mirror units 1213, 1223 to change the convergence angle in the imaging process (the convergence angle is to be decreased). The respective inward mirror units (1213, 1223) are pivoted by actuating the second controller (126) so as to further change its angle. Referring to the figure, when the left inward mirror unit 1213 generates clockwise deflection by the rotation shaft 1214 and the right inward mirror unit 1223 generates counterclockwise deflection by the rotation shaft 1224, the original convergence angle θ1 will gradually decrease to θ2 (as shown in the figure). On the contrary, the convergence angle will gradually increase. Again, the old and new convergence point locations can be obtained by the aforementioned method for computing CP and CP'.

Figure 10:
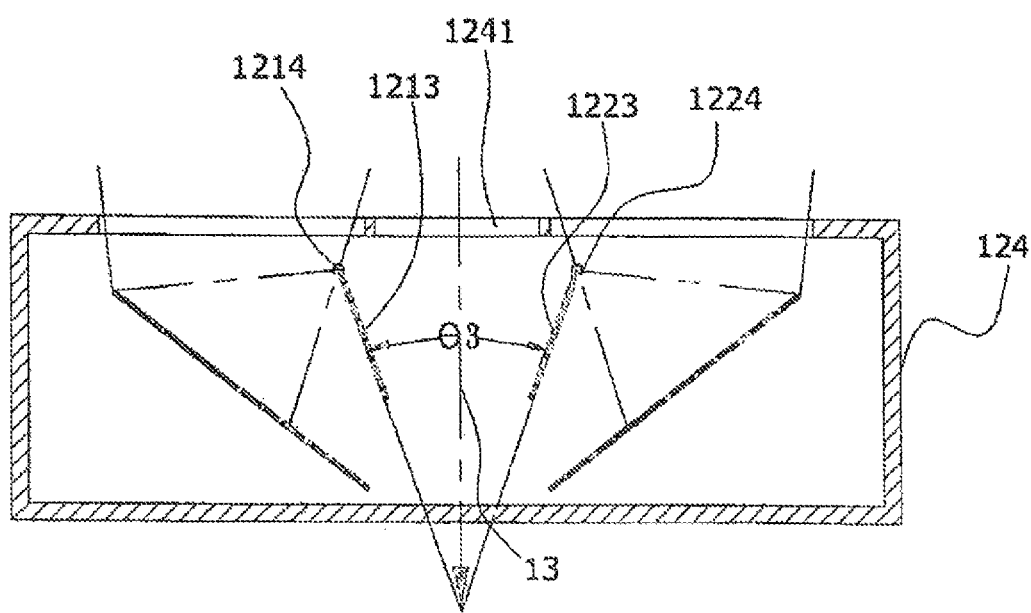
FIG. 10 schematically depicts the two-channel reflector of FIG. 2, including a housing defining a central imaging inlet.

FIG. 10 schematically shows a system structure (housing 124) which defines a central imaging inlet 1241. By this housing 124, the two channel reflector can be used for 2D or 3D imaging to extend its overall practical value. If only 2D imaging is needed in implementation, operators can drive the rotation shafts (1214, 1224) via second controller 126 to pivot the inward mirror units (1213, 1223) to cause a deflection. As shown in the figure, when two opposite inward mirror units (1213,1223) deflect to a suitable angle (that is, the left and right inward mirror units (1213, 1223) are overlapped with the left and right boundaries of the horizontal field of view (FOV) of the imager), a central imaging channel 13 is formed between these two units, and the image (or light rays) entering from the left and right imaging channel only conducts total reflection between the outward and the inward mirror units, thus being unable to reach the imager. In this way, the imager can only capture a single image, so it is suitable for 2D imaging. On the other hand, to switch to 3D mode to conduct imaging, the two opposite inward mirror units (1213, 1223) are first deflected or pivoted back to their original locations by the control of the second controller 126. In this manner, the present two channel reflector can be adapted for 2D or 3D imaging according to the operator's preference.

Figure 11A:
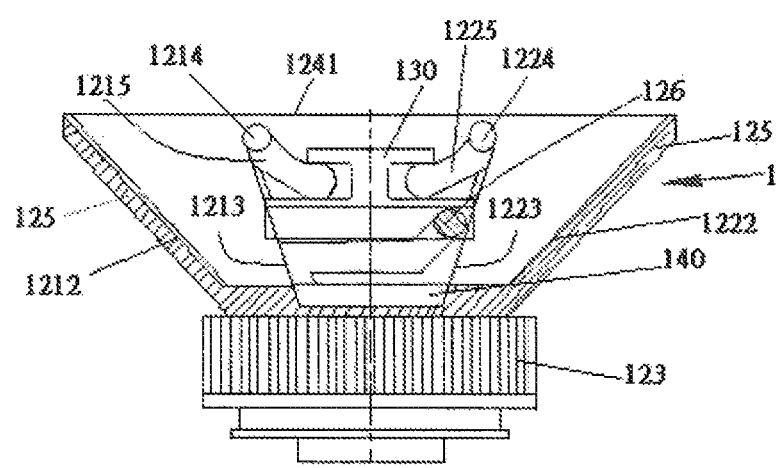
FIG. 11A depicts an embodiment of the two-channel reflector of the present disclosure, placed in two-dimensional mode.
Figure 11B:
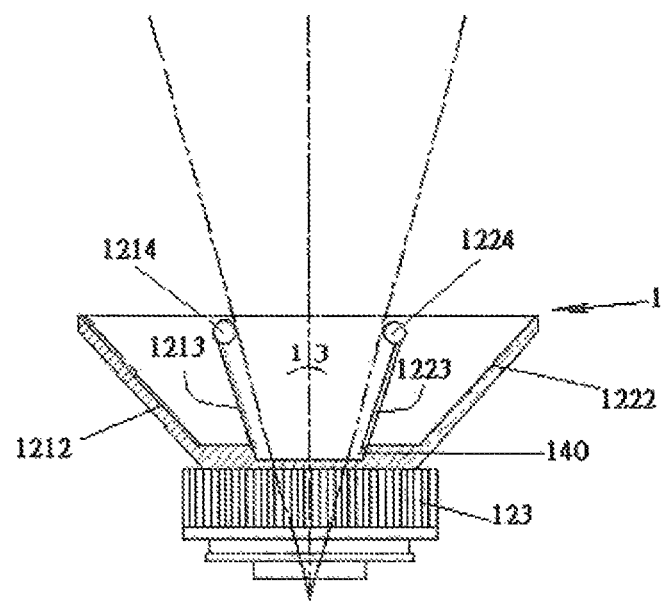
FIG. 11B depicts the two-channel reflector of FIG. 11A configured to provide a central imaging inlet in two-dimensional mode.
Figure 12A:
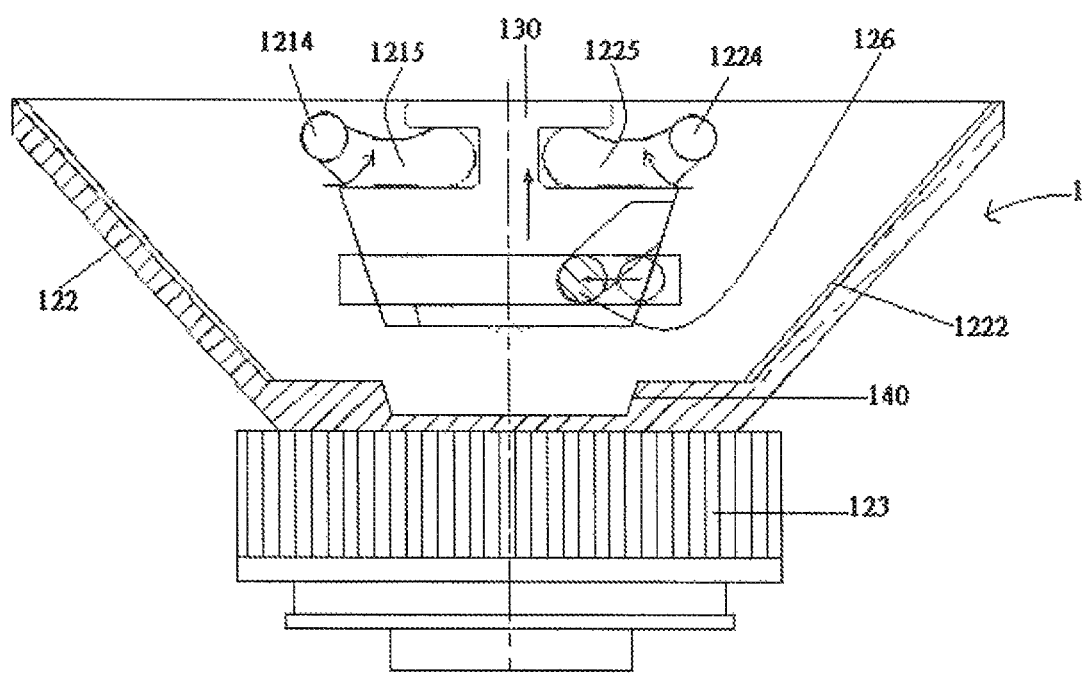
FIG. 12A depicts the two-channel reflector of FIG. 11A, placed in three-dimensional mode.
Figure 12B:
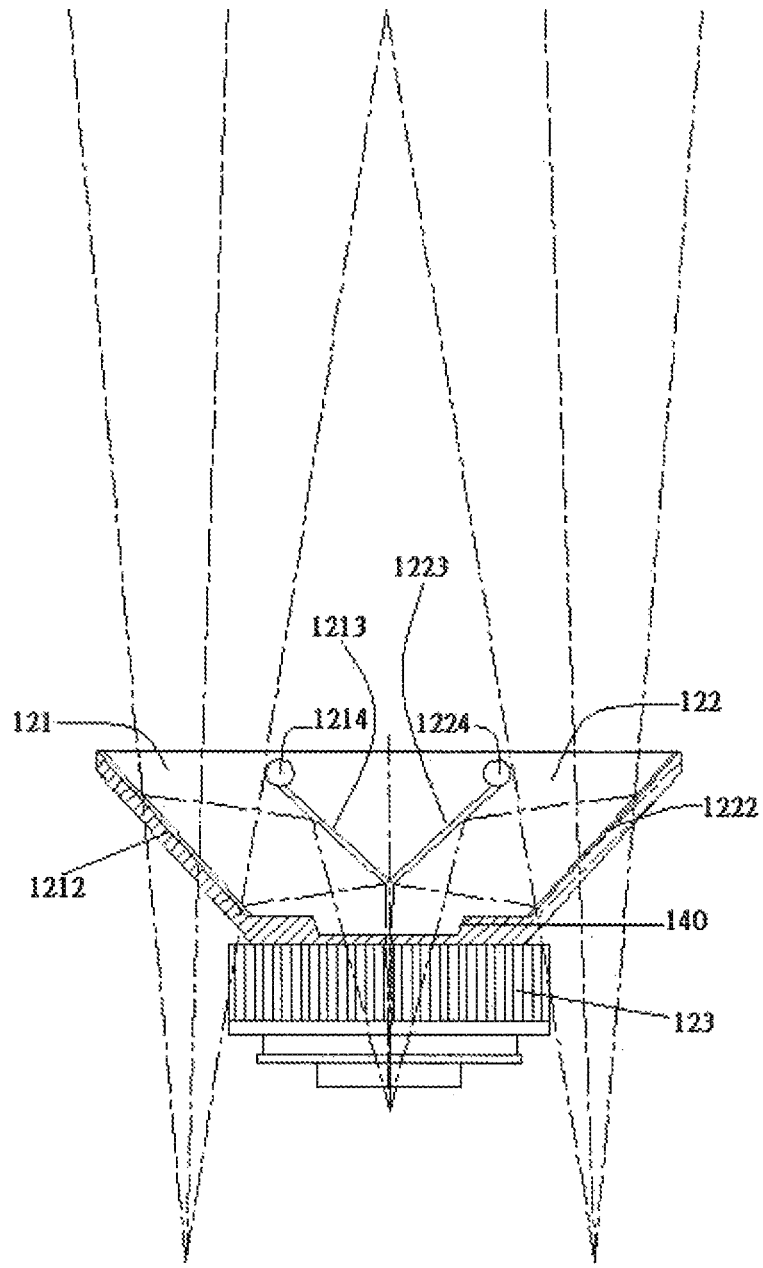
FIG. 12B depicts the two-channel reflector of FIG. 12A, configured for passage of light to an imager through a left imaging channel and a right imaging channel but substantially blocking passage of light through the central imaging channel.
Figure 13A:
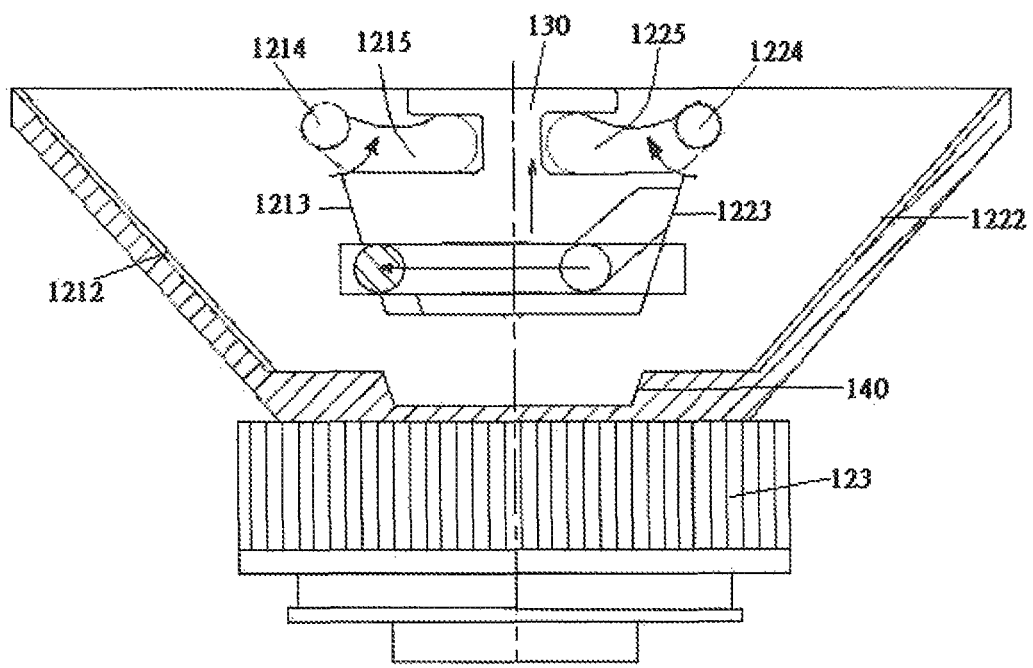
FIG. 13A depicts the two-channel reflector of FIG. 12A, showing pivoting of the displaceable inward mirror units to adjust a light convergence angle.
Figure 13B:
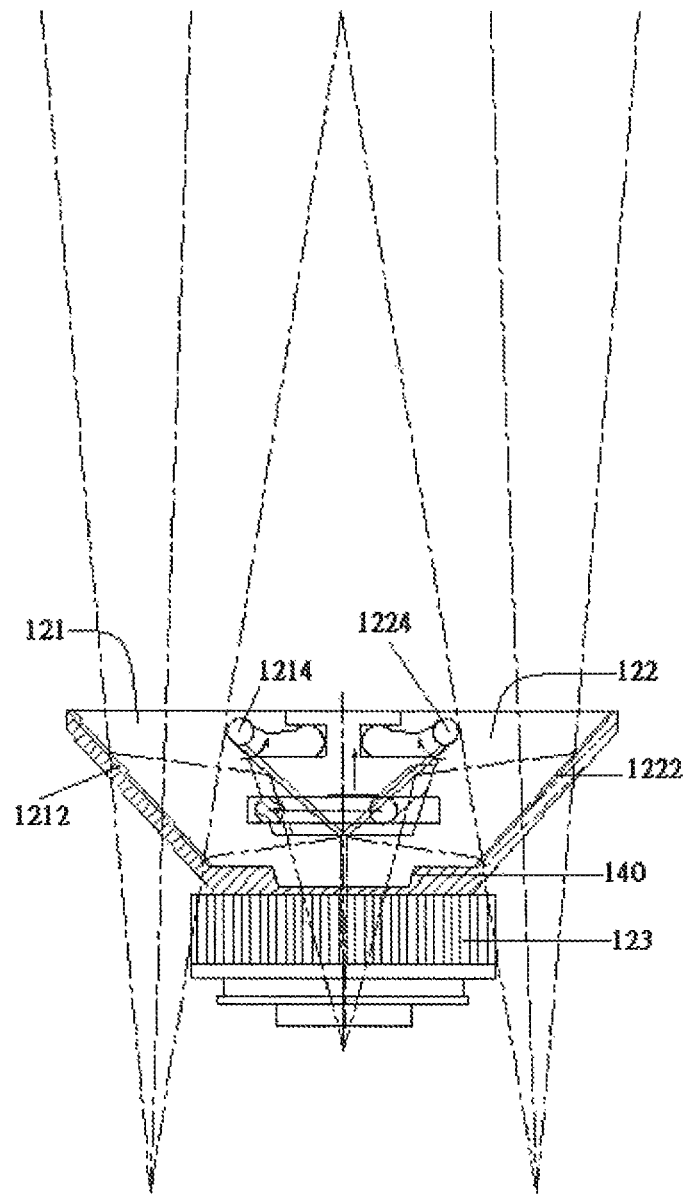
FIG. 13B illustrates passage of light through the two-channel reflector of FIG. 13A to define two virtual cameras.

In more detail (see FIGS. 11-13), an initial situation, the 2D mode, is depicted in FIGS. 11A-11B. In this situation, axis of the second controller 126 is at the right end of a slot switch (see FIG. 11A), and the left inward mirror unit 1213 and the right inward mirror unit 1223 are slightly behind the left boundary and the right boundary of the imager's horizontal field of view (FOV), respectively, and consequently a central imaging inlet 13 is formed (see FIG. 11B). When the second controller is pulled to the left (see FIGS. 12A-12B), the axis of the controller 126 pushes the mechanical part 130 upward which, in turn, forces arm of the left inward mirror unit 1215 and arm of the right inward mirror unit 1225 to rotate about the rotation shafts (1214, 1224) counterclockwise and clockwise, respectively (see FIG. 12A), so that the inward mirror units 1213, 1223 would be moved toward the positions shown in FIG. 12B. This is the initial stage of the 3D mode. In this situation, light rays can reach the imager through the left imaging channel 121 and the right imaging channel 122, but most of the light rays entering the central imaging channel 13 will be blocked by the inward mirror units. In this situation, the left inward mirror unit 1213 and the right inward mirror unit 1223 are close to each other, but not contacting (see FIG. 12B) and the mechanical part 130 is close to but not contacting the housing 124 (see FIG. 12A).

The room left between the left inward mirror unit 1213 and the right inward mirror unit 1223 (also, the room left between the mechanical part 130 and the housing 124) can be used to adjust the convergence angle of the 3D mode. By adjusting the location of the second controller 126 between the left end of the slot switch and its location in FIG. 12 (see FIGS. 13A-13B), the operator can adjust the convergence angle accordingly.

Figure 14:
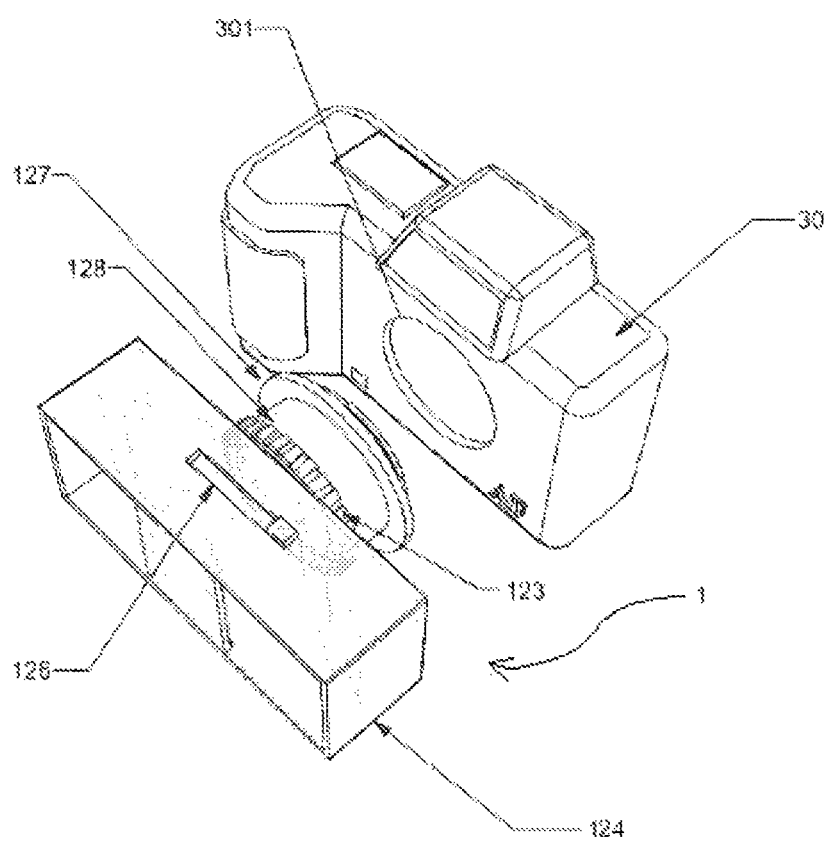
FIG. 14 depicts an imaging system according to the present disclosure.

FIG. 14 depicts an imaging system according to the present disclosure. The imaging system 1 including a two channel reflector with lens 1 providing disparity and convergence angle control as described above is constructed in such a manner that, in its outside appearance, the first controller 123 and the second controller 126 are disposed on the housing 124 for easy access and operation. As to the figure, the present invention is assembled to the lens mount 301 of a camera 30 by an adapter ring 127. Operation can be conducted as described above after assembly is completed.

Summarizing, the present disclosure provides an imaging system where the outward mirror unit location is changed to change the relative distance between the outward and the inward mirror unit to control the disparity. Further, the present disclosure provides an imaging system where the inward reflection unit deflection angle is adjusted in micro-scale to control the convergence angle. Moreover, the present disclosure provides an imaging system where the inward reflection unit deflection angle is adjusted so that a central image inlet is formed between two opposite inward mirror units. In this case, the opposite total-reflection is formed between the outward and the inward mirror unit to block the image (or light rays) from entering the right and the left imaging channel to form 2D image mode. In this manner, the present invention can provide an imaging system enabling the control of disparity, convergence angle, and the operation of 2D or 3D image mode operation.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A single lens two-channel reflector providing disparity and convergence angle adjustability for two-dimensional and three-dimensional imaging, comprising:

a reflector arrangement adapted to define a left imaging channel and a right imaging channel, each being defined by a laterally and horizontally displaceable outward reflector and a displaceable inward reflector;

a first controller for laterally displacing each laterally and horizontally displaceable outward reflector in its entirety to alter a distance between each said laterally and horizontally displaceable outward reflector and each said displaceable inward reflector; and a second controller for pivoting each displaceable inward reflector to alter a deflection angle of light impinging on said each displaceable inward reflector.

2. The single lens two-channel reflector of claim 1, further including a housing defining left, central, and right imaging inlets, and an imaging outlet.

3. The single lens two-channel reflector of claim 2, wherein the first controller is an idler unit operatively contacting each said laterally displaceable outward reflector for simultaneously translating each said laterally displaceable outward reflector.

4. The single lens two-channel reflector of claim 3, further including at least one biasing element disposed between the housing and each said laterally displaceable outward reflector and adapted to return each said laterally displaceable outward reflector to an original position.

5. The single lens two-channel reflector of claim 2, further including a lens disposed at the imaging outlet.

6. The single lens two-channel reflector of claim 5, further including an adaptor for operatively connecting the single-lens two-channel reflector to an imager.

7. A single lens two-channel reflector-based imaging system providing disparity and convergence angle adjustability, comprising:

a reflector arrangement adapted to define a left imaging channel and a right imaging channel, each said left and right imaging channel being defined by a laterally and horizontally displaceable outward reflector and a displaceable inward reflector;

a first controller for laterally displacing each laterally and horizontally displaceable outward reflector in its entirety to alter a distance defined between each said laterally and horizontally displaceable outward reflector and each said displaceable inward reflector;

a second controller for pivoting each displaceable inward reflector to alter a defined deflection angle of light impinging on said each displaceable inward reflector;

a housing defining left, central, and right imaging inlets and an imaging outlet; and an imager operatively connected to the housing imaging outlet.

8. The imaging system of claim 7, wherein said laterally displacing and said pivoting may be selectively applied to orient said laterally displaceable outward reflectors and said displaceable inward reflectors to reflect light to provide one of:

a single imaging channel between a scene and the imaging outlet; and said left imaging channel and said right imaging channel providing corresponding left and right views of the scene for comparison to define a disparity therebetween.

9. The imaging system of claim 7, wherein the first controller is an idler unit operatively contacting each said laterally displaceable outward reflector for simultaneously translating each said laterally displaceable outward reflector.

10. The imaging system of claim 9, further including at least one biasing element disposed between the housing and each said laterally displaceable outward reflector and adapted to return each said laterally displaceable outward reflector to an original position.

11. The imaging system of claim 7, further including a lens disposed at the imaging outlet.

12. A method for obtaining two-dimensional and/or three-dimensional images of a scene by a single imager, comprising:

providing a single lens two-channel reflector-based imaging system according to claim 7; and manipulating each said laterally and horizontally displaceable outward reflector and said displaceable inward reflector to provide one of a single view or a left and a right view of the scene to the imager.

13. The method of claim 12, comprising pivoting each said displaceable inward reflector to define a single imaging channel between the scene and the imaging outlet to provide a single view of the scene to the imager to provide a two-dimensional rendering of the scene.

14. The method of claim 13, further including displacing each said displaceable inward reflector to contact an edge of each said displaceable inward reflector to said imaging outlet to define the single imaging channel.

15. The method of claim 12, comprising manipulating each said laterally and horizontally displaceable outward reflector and each said displaceable inward reflector to define the left imaging channel and the right imaging channel providing corresponding left and right views of the scene to the imager;

comparing said left and right views of the scene to define a disparity between said views; and calculating a depth of objects shown in the scene from said disparity to provide a three-dimensional rendering of the scene.

16. The method of claim 15, including positioning each said displaceable inward reflector to provide a deflection angle of light reflecting from each said laterally and horizontally displaceable outward reflector and impinging on said each displaceable inward reflector.

17. The method of claim 16, further including calculating a location of a left virtual camera and a right virtual camera simulated by said left imaging channel and said right imaging channel.

18. The method of claim 17, further including calculating an original convergence point of said left virtual camera and said right virtual camera.

19. The method of claim 18, further including translating each said laterally and horizontally displaceable outward reflector to alter a distance defined between each said laterally and horizontally displaceable outward reflector and each said displaceable inward reflector to alter an intraocular distance between a first virtual camera and a second virtual camera defined by the left and right imaging channel.

20. The method of claim 19, further including calculating a next convergence point of said left virtual camera and said right virtual camera.

* * * * *